United States Patent [19]

Boffardi et al.

[11] Patent Number: 4,783,267

[45] Date of Patent: Nov. 8, 1988

[54] METHOD FOR STABILIZING METAL IONS

[75] Inventors: Bennett P. Boffardi, Bethel Park; Susan P. Rey, Coraopolis, all of Pa.

[73] Assignee: Calgon Corporation, Pittsburgh, Pa.

[21] Appl. No.: 67,336

[22] Filed: Jun. 29, 1987

[51] Int. Cl.$^4$ ................................. C02F 5/14
[52] U.S. Cl. ..................................... 210/699
[58] Field of Search ........................ 210/699, 700

[56] References Cited

U.S. PATENT DOCUMENTS

| 4,617,129 | 10/1986 | Lees | 210/700 |
| 4,681,686 | 7/1987 | Richardson et al. | 210/699 |
| 4,689,200 | 8/1987 | Cook et al. | 210/699 X |

Primary Examiner—Tom Wyse
Attorney, Agent, or Firm—W. C. Mitchell; M. C. Sudol, Jr.

[57] ABSTRACT

A method for stabilizing metal ions in recirculating water systems is disclosed. This method utilizes 2-hydroxyphosphonoacetic acid at a dosage of 0.1–100 ppm to solubilize metal ions thereby reducing deposition and corrosion.

14 Claims, No Drawings

METHOD FOR STABILIZING METAL IONS

BACKGROUND OF THE INVENTION

Many metal ions are essentially insoluble in aqueous systems having pH's ranging from approximately 6.0 to 9.0. Within this pH range, these metals, including but not limited to iron, zinc, aluminum and manganese, will deposit on heat transfer surfaces causing underdeposit attack. The addition of 2-hydroxyphosphonoacetic acid increases the solubility of these ions in solution, thereby reducing their tendency to deposit as insoluble salts and protecting against related corrosive attack.

U.S. Ser. No. 847,995 discloses a method for solubilizing aluminum ions in recirculating water systems using acrylic acid/sulfonic acid polymers.

2-hydroxyphosphonoacetic acid is commercially available from Ciba-Geigy under the tradename Belcor® 575. While 2-hydroxyphosphonoacetic acid is known in the water treatment art as a corrosion inhibitor and as a calcium carbonate scale inhibitor, the ability of 2-hydroxyphosphonoacetic acid and its salts to solubilize metal ions in aqueous systems is not known in the art.

DESCRIPTION OF THE INVENTION

The present invention is directed to a method for solubilizing metal ions in aqueous systems comprising adding to the system being treated an effective amount of 2-hydroxyphosphonoacetic acid, or salt thereof. Thus, 2-hydroxyphosphonoacetic acid stabilizes metal ions, thereby preventing metal ion deposition and the associated corrosion of recirculating water system equipment.

2-hydroxyphosphonoacetic acid stabilizes metal ions in aqueous systems, including but not limited to iron ($Fe^{+2}$ and $Fe^{+3}$), aluminum, zinc and manganese ions, by solubilizing these ions at pH's where they are generally insoluble.

As used herein, the term "effective amount" refers to that dosage of 2-hydroxyphosphonoacetic acid or salt thereof which stabilizes a given aqueous system containing a metal ion against deposition of insoluble metal ion salts and associated underdeposit corrosion. Generally, the effective amount will range from about 0.1 to about 100 ppm, based on the total weight of the aqueous system being treated. Preferably, the effective amount will range from about 0.1 to about 10 ppm, based on the total weight of the aqueous system being treated.

Iron ($Fe^{+2}$ and $Fe^{+3}$), zinc, aluminum and manganese ions are generally insoluble in aqueous systems having pH's ranging from about 6.0 to about 9.0. The instant additive, or a salt thereof, increases ion solubility in this critical pH range. Any salt or homologue of 2-hydroxyphosphonoacetic acid can be used. The preferred salts are the sodium and potassium salts.

EXAMPLES

The following examples further demonstrate the instant invention. They are not, however, intended to limit the scope of the instant invention in any way.

The examples demonstrate the stabilizing effect of 2-hydroxyphosphonoacetic acid on $Fe^{+2}$, $Fe^{+3}$, $Mn^{+2}$, $Zn^{+2}$ and $Al^{+3}$.

In all examples a 50% (by weight) aqueous solution of 2-hydroxy-phosphonoacetic acid was used as the inhibitor stock solution.

EXAMPLES 1-4

$Fe^{+2}$ Stabilization $Fe^{+2}$ stabilization tests were carried out at ambient temperature, using Robinson Township, Pa., tap water having a pH of 7.0–7.2. The procedure included the following steps:

1. 996.1 gms of Robinson tap water were added to a 1,000 ml beaker; 1.5 ml of 1.0 M $NaHCO_3$ and 0.4 ml of 1.0 M NaOH were then added to the water.

2. 2.0 mls of 1.0 g/l $Fe^{+2}$ stock solution made from $Fe(NH_4)_2(SO_4)_2 \cdot 6H_2O$ were then added under the surface of the water. When the pH stabilized (less than 5 minutes) the solution was agitated using a gang stirrer at 20 rpm for 2.0 hours. This solution served as the control.

3. Inhibited solutions were prepared by adding the inhibitor stock solution immediately after step 1 in an amount sufficient to give the desired inhibitor concentration and by adjusting the volume so as to always maintain 1,000 ml of test solution.

4. The inhibited samples were filtered after the 2.0 hour agitation period using Whatman 41 filter paper (25 μm).

5. For each sample, 50 mls of filtrate were acidified with 2.5 ml of concentrated HCl. The acidified filtrate samples were analyzed using atomic absorption spectroscopy and the results for the inhibited samples were compared to the results for the control. Percent (%) stabilization values were then calculated; these values are shown in Table 1, below. 2 mg/l $Fe^{+2}$ in the filtrate is the theoretical amount and is equivalent to 100% inhibition. When no inhibitor is present, the filter paper removes $Fe^{+2}$. This represents 0% stabilization.

TABLE 1

| | $Fe^{+2}$ Stabilization Results | |
|---|---|---|
| Example Number | Dosage of 2-hydroxy-phosphono-acetic Acid | % Stabilization |
| 1 | 2.00 | 43 |
| 2 | 4.00 | 66 |
| 3 | 6.00 | 73 |
| 4 | 8.00 | 87 |

EXAMPLES 5-8

$Fe^{+3}$ Stabilization

The test procedure of Examples 1–4 was repeated, instead using a $Fe^{+3}$ stock solution prepared from $FeCl_3$. The results are shown in Table 2.

TABLE 2

| | $Fe^{+3}$ Stabilization Results | |
|---|---|---|
| Example Number | Dosage of 2-hydroxy-phosphono-acetic Acid | % Stabilization |
| 5 | 2.00 | 29 |
| 6 | 4.00 | 49 |
| 7 | 6.00 | 60 |
| 8 | 8.00 | 62 |

EXAMPLES 9-11

$Al^{+3}$ Stabilization

The procedure described in Examples 1–4 was used, except that $Al^{+3}$ stabilization was measured at various pH's and the test water was Pittsburgh water at 4 cycles concentration (4×), aerated and heated to 50° C. Thus, 8.0 liters of 4× Pittsburgh water were placed into a test cell. Inhibitor was added under the surface of the water at a dosage of 10 mg/l. The $Al^{3+}$ concentration in each case was 5 mg/l; pH adjustments were made using 1.0 M NaOH. Filtration occurred after 24 hours at 50° C. Results are shown in Table 3.

TABLE 3

| $Al^{+3}$ Stabilization Results | | |
|---|---|---|
| Example Number | pH | % Stabilization |
| 9 | 7.0 | 11 |
| 10 | 8.0 | 34 |
| 11 | 9.0 | 79 |

EXAMPLES 12–13

$Mn^{+2}$ Stabilization

For the $Mn^{+2}$ stabilization tests, 998 gms of ambient Robinson Township tap water were added to 1000 ml beakers for each test. 2 mls of 1.0 g/L $Mn^{+2}$ stock solution prepared from $Mn(NO_2)_2$ were then added under the surface of the water, followed by 5 drops of Clorox® as an oxidizer. The pH was adjusted to 8.0, and the sample was agitated using a gang stirrer for 4.0 hours. The procedures described in Examples 1–4 were then used to determine % stabilization values. The results are shown in Table 4.

TABLE 4

| $Mn^{+2}$ Stabilization Results | | |
|---|---|---|
| Example Number | Dosage of 2-hydroxphosphono-acetic Acid (mg/L) | % Stabilization |
| 12 | 2.00 | 91 |
| 13 | 4.00 | 100 |

EXAMPLES 14–17

$Zn^{+2}$ Stabilization

For these examples, the procedures of Examples 9–11 were followed. Thus, $Zn^{+2}$ stabilization was measured in 4× Pittsburgh water after 24 hours of aeration at 50° C. and at various pH's. The $Zn^{+2}$ concentration in each case was 5.0 mg/L, prepared from a $ZnCl_2$ solution. The inhibition concentration was 10 mg/L. Results are shown in Table 5.

TABLE 5

| $Zn^{+2}$ Stabilization Test Data | | |
|---|---|---|
| Example No. | pH | % Stabilization |
| 14 | 7.5[1] | — |
| 15 | 8.0 | 34 |
| 16 | 8.5 | 42 |
| 17 | 9.0 | 40 |

[1]Little precipitation of $Zn^{+2}$ occurred at pH 7.5, therefore % stabilization was not applicable.

What is claimed is:

1. A method for solubilizing metal ions in an aqueous system comprising adding to said system an effective amount of 2-hydroxyphosphonoacetic acid or a salt thereof, wherein said metal ion is selected from the group consisting of $Fe^{+2}$, $Fe^{+3}$, $Zn^{+2}$, $Al^{+3}$ and $Mn^{+2}$.
2. The method of claim 1, wherein said aqueous system is at a pH ranging from about 6.0 to about 9.0.
3. The method of claim 1, wherein said effective amount is from about 0.1 to 100 ppm, on a weight basis.
4. The method of claim 2, wherein said effective amount is from about 0.1 to 100 ppm, on a weight basis.
5. The method of claim 3, wherein said metal ion is $Fe^{+2}$.
6. The method of claim 3, wherein said metal ion is $Fe^{+3}$.
7. The method of claim 3, wherein said metal ion is $Zn^{+2}$.
8. The method of claim 3, wherein said metal ion is $Al^{+3}$.
9. The method of claim 3, wherien said metal ion is $Mn^{+2}$.
10. The method of claim 4, wherein said metal ion is $Fe^{+2}$.
11. The method of claim 4, wherein said metal ion is $Fe^{+3}$.
12. The method of claim 4, wherein said metal ion is $Zn^{+2}$.
13. The method of claim 4, wherein said metal ion is $Al^{+3}$.
14. The method of claim 4, wherein said metal ion is $Mn^{+2}$.

* * * * *